INVENTORS:
BART T. HEFFERNAN and
EFREM M. OSTROWSKY

BY Grist, Lockwood, Greenawalt & Dewey
ATTY'S

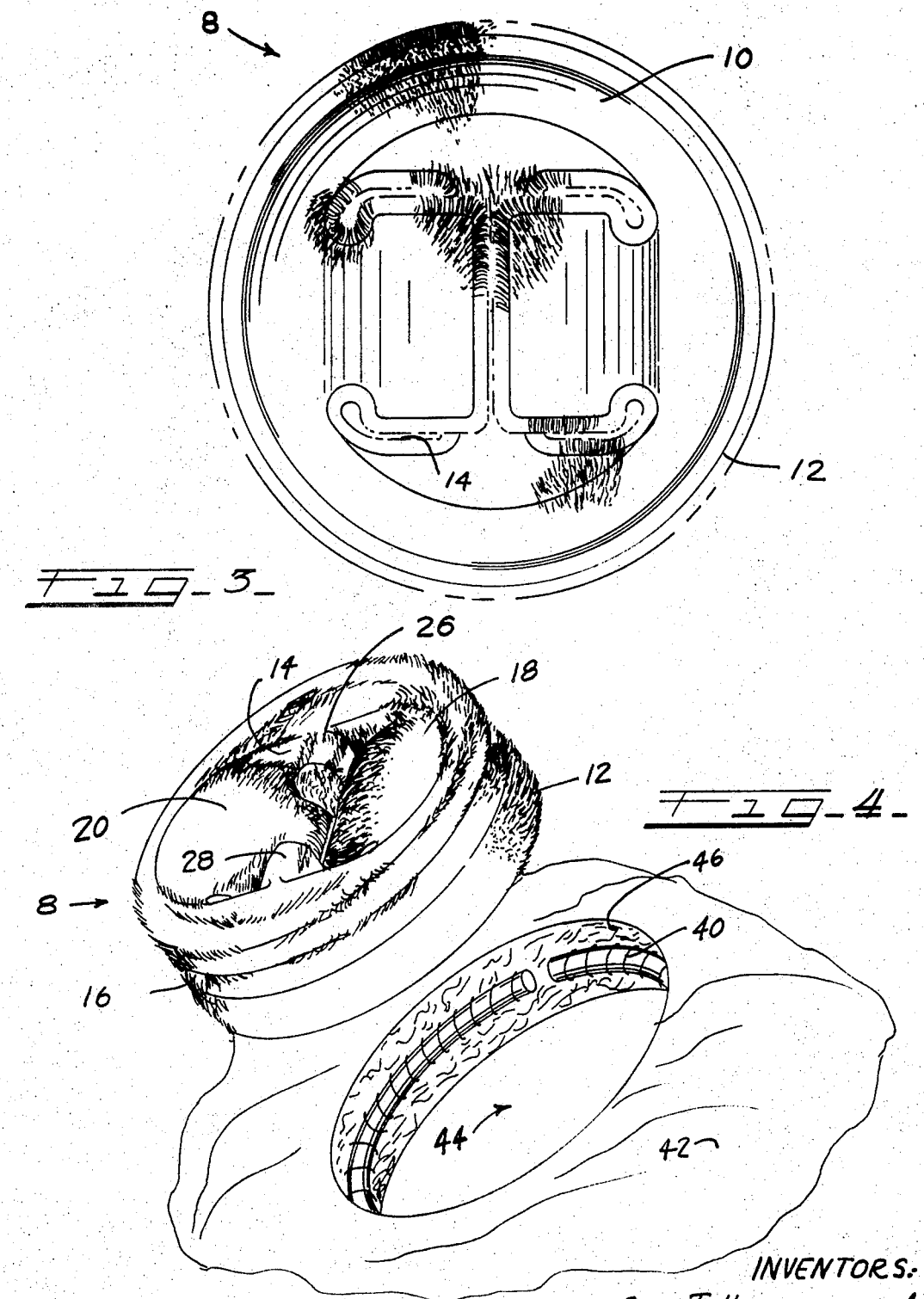

United States Patent Office 3,579,642
Patented May 25, 1971

3,579,642
HEART VALVE ASSEMBLY AND METHOD OF IMPLANTING IN THE BODY
Bart T. Heffernan, 604 Laurel, Wilmette, Ill. 60091, and Efrem M. Ostrowsky, 2775 Fort Sheridan Ave., Highland Park, Ill. 60035
Filed Apr. 15, 1968, Ser. No. 721,360
Int. Cl. A61f 1/22
U.S. Cl. 3—1                                  4 Claims

ABSTRACT OF THE DISCLOSURE

A check valve for use in a human heart or the like in which the body portion contains check valve means on the inside thereof and in which the outer wall portions contain a groove around the periphery thereof to receive a fastener in the form of a snap ring or the like. A method is described in which a membrane is opened, a stiff but resilient fastener such as a snap ring is sewn in place therein, closely adjacent the edges of the membrane which define the opening therein, and a check valve such as that described is napped into place in the opening in the membrane as the ring is opened and closed over the valve, in registry with the groove. Preferably, the valve is a plastic material and the ring is stainless steel or stiff silicone rubber. The valve and method make it possible to immobilize thrombogenic materials resulting from the inclusion of a heart valve or the like in the body.

BACKGROUND OF THE INVENTION (1) Field of the invention

The field of the invention, in general, is that of prosthetic devices for human and animal beings, and, more particularly, that of heart valves or the like which are adapted to be held in a desired position by a snap ring or the like, enclosing the body of the valve, wherein the snap ring in turn is held in place in the body by being sewn or otherwise fastened in place relative to the membrane or other anatomical part of the body.

More specifically, the field is that of prosthetic valves, for example, atrio-ventricular valves, having groove means around an outside periphery thereof, especially adapted to receive fastener means in the form of a snap ring, wherein the snap ring is located so that the body of the valve shrouds the ring from the bloodstream to reduce the likelihood of thrombogenic materials entering the bloodstream and causing undesired clotting and the like.

In another aspect, the invention is particularly directed to a method which reduces the time the heart or other body member must be exposed during surgery, by providing the opportunity for the surgeon to cut an opening, such as by way of removing a damaged or diseased valve, to sew a retainer ring into the opening thus formed, and thereupon to spread the ring slightly and insert the valve body partially therethrough and release the snap ring, allowing it to register with the groove in the valve and hold the valve in place.

(2) Description of the prior art

Prosthetic atrio-ventricular heart valves are known in the prior art, and several methods of inserting them into the body are presently known and are recognized as accepted surgical techniques. However, such valves and methods have certain characteristic shortcomings and drawbacks, which will be briefly discussed herein.

Basically, presently known methods call for selecting a heart valve, either of the cuspate type or the ball check or caged ball check type, and, after opening the chest cavity and a wall of the heart, sewing the valve in place by joining the cuff provided on such valve to the membrane with a series of stitches with ordinary sutures. Commonly, the stitches are in the form of long loops, with portions of the sutures extending from the inside walls of the opening in the membrane outwardly a distance of nearly an inch or more to the sewing cuff. After completion of the last stitch, the sutures are pulled, and the entire valve moves into position within the openings. It is well recognized that this surgical procedure calls for the chest cavity and the heart to be open for lengthy periods, sometimes as much as an hour or more. During this time, the pump oxygenator circulates the blood throughout the body. Although important strides have recently been made in this field, use of the pump oxygenator is not desirable, particularly over long periods, since such treatmnet is traumatic to the blood itself, adversely affecting the acid-base balance, pH, and the electrolytes in the blood, among other things.

Other methods of overcoming the problem of having the heart and chest open for unduly lengthy periods have been attempted, such as providing the valve with integrally formed steel clip or clamp members, but manipulation of such valves is difficult, sizing is critical, and most, if not all, of such constructions leave portions of the pins which replace the sutures exposed to the bloodstream.

It is also well known that it is very desirable to avoid having foreign or thrombogenic materials exposed to the bloodstream, and certain attempts have been made to modify known heart valves so as to mask the sewing cuff or the like. However, most of these prior art efforts have not been completely successful; nonetheless, they serve as a clear acknowledgment of the problem set forth above.

SUMMARY OF THE INVENTION

In view of the shortcomings of known prior art heart valves, it is an object of the invention to provide a heart valve of a novel construction.

Another object is to provide a heart or like valve which may be used with fastener means, such as a snap ring, whereby the fastener may be readily inserted in a desired location, and the valve easily held in place in the fastener by placing it therein with simple manipulative steps.

A further object of the invention is to provide a heart valve having a body portion with a central opening and an outside wall, in which the outside wall has a groove therein which is adapted to receive a fastener therein of suitable shape.

An additional object is to provide such a valve which additionally includes flaps integrally joined to the body portion, stop means for the flaps, a velour finish to assist in joining the valve to the heart, and to provide a fastener ring for such valve assembly.

A further object is to provide a method of inserting a valve in a human or animal body which includes the steps of forming an opening, sewing a stiff but resilient ring or like fastener into such opening, and then inserting a valve into the opening such that the ring comes into registry with a groove formed in the outer periphery of the valve body.

These objects, and other objects and advantages inherent in the invention are obtained by providing a valve with a body including an inner periphery defining a fluid passage and an outer periphery having groove means therein, check means in the fluid passage for opening and closing the passage in response to change in the direction of fluid flow therethrough, by providing a fastener ring for such valve for reception in said groove means, and by providing a method which includes the steps of creating an opening in a body membrane, sewing fastener means in place, and thereafter expanding the fastener means, moving the body into place with the fastener surrounding the groove, and allowing the ring to close over the groove means in registry therewith.

The exact manner in which this invention is carried out will become more apparent as the description proceeds, and particularly when considered in conjunction with the description of the preferred embodiments of the invention shown in the accompanying drawings, in which like reference characters denote corresponding parts throughout.

BRIEF DESCRIPTION OF THE DRAWINGS

FIG. 3 is a bottom plan view of the check valve assembly of FIGS. 1 and 2;

FIG. 4 is an exploded view showing the check valve assembly of the invention and the relation thereof to a membrane having fastening means therein in the form of a snap ring.

BRIEF DESCRIPTION OF THE PREFERRED EMBODIMENTS

Figure 1:
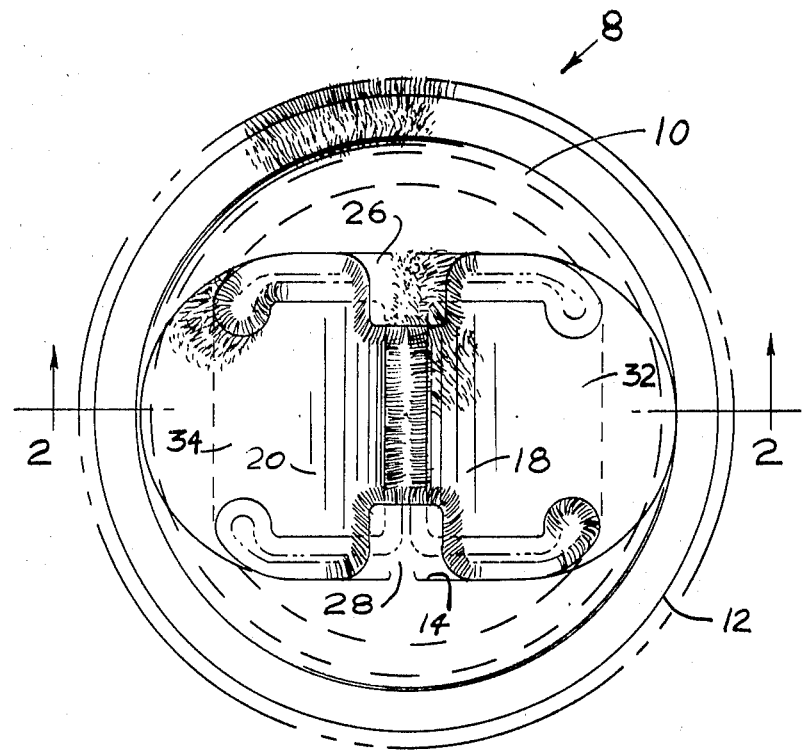
FIG. 1 is a top plan view showing an embodiment of the check valve of the present invention.

Referring now to the drawings, the preferred embodiments of the invention will be described in greater detail. Although the structural features of certain portions of the check valve assembly shown and described herein are not essential to the invention, a preferred form of the valve unit will now be described, after which a method of insertion and use thereof in a living animal will be described.

It should be understood, in reference to the drawings and other descriptions herein, that directions and orientations of assemblies and parts thereof are merely illustrative, since the valve assembly described and claimed herein may be used in any position or orientation desired.

Figure 2:
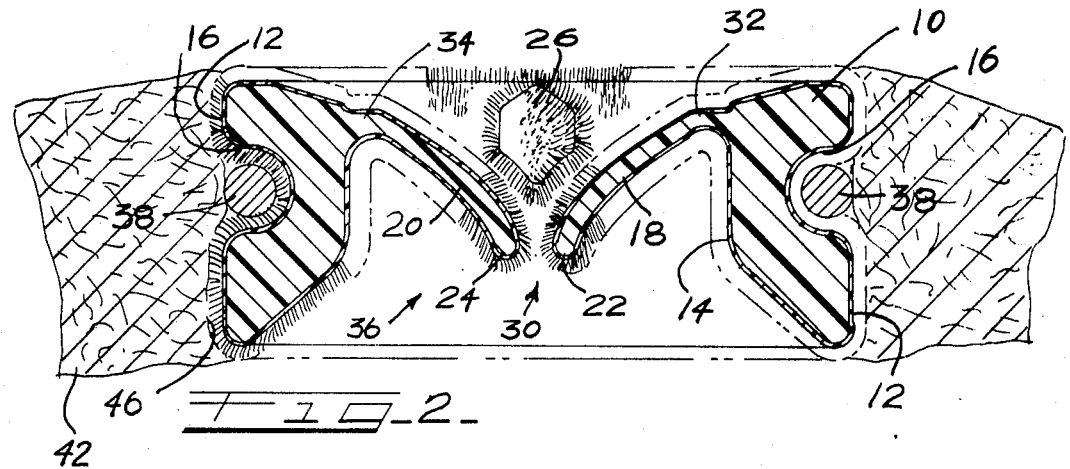
FIG. 2 is a vertical sectional view, of the check valve assembly of FIG. 1, taken along lines 2—2 thereof.

Referring now particularly to FIGS. 1, 2 and 3, there is shown a check valve assembly 8 having a body portion 10, the outer periphery of said body portion 10 being defined by outer side wall portions 12 and the inner periphery thereof by inner side wall portions 14. The outer side walls 12, which are generally cylindrical in this embodiment, include groove means 16 therein, and the groove means 16 are disposed approximately in the middle of the side walls 12, for reasons which will be explained in detail later. Joined to the inner side wall portions 14 are a pair of flaps 18, 20 with respective inner edge portions 22, 24 thereof shown in abutting relation in the closed position. Stop means in the form of two projections 26, 28 extend inwardly from the inner sidewall 14, and prevent undue upward movement of the flaps past the closed position thereof. In the embodiment shown, the flaps 18, 20 and stop means 26, 28 combine to define a valve assembly 30 which includes integrally formed hinge portions 32, 34 for said flaps 18, 20. The flaps 18, 20 and the inner side wall portions 14 combine to define fluid passage means 36, which extend centrally through the body of the valve assembly 8.

Referring now particularly to FIGS. 2 and 4, fastening means for the valve body 10 in the form of snap ring 38 are shown, and are held in place by sutures or the like 40 in a membrane 42 comprised of human tissue, which, in this case, has an opening 44 (FIG. 4) defined by inwardly facing peripheral side walls 46.

In the embodiment shown the snap ring 38 is sewn to the membrane 42 and is therefore held in place therein by the sutures 40, while the check valve assembly 10 is held in place by reason of being surrounded by the snap ring 38 which is in registry with the groove means 16.

In use, flow of blood through the fluid passage means 36 is readily permitted in one direction, for example, downwardly as shown in FIG. 2, but is largely prevented in the other direction, that is, upwardly as shown in FIG. 2, since the flaps 18, 20, are readily opened by flow therethrough of fluid in one direction, but are forced toward each other when fluid flow tends to be in the opposite direction.

Since the flaps 18, 20 are very easily moved or deflected, the provision of the stop means in the form of projections 26, 28 is desired, so that the flaps 18, 20 do not tend to be forced past the point necessary for them to close and restrict or prevent flow therethrough.

Referring now, for example, to FIGS. 1 and 3, a clearance opening is shown to be present between portions of the side walls 14 and the flap means 18, 20. This clearance space is permissible, since, in operation, when used as a heart valve, the seal need not be completely liquid tight, but only effective to prevent substantial backward flow through the valve assembly 30, since slight flow therethrough is not actually harmful.

Referring now particularly to FIG. 4, certain steps of a method for installing a check valve of the present invention are shown. Ordinarily, assuming that the valve described herein is to be used as an atrio-ventricular or mitral heart valve, the damaged or diseased valve which normally occupies a place in the membrane 42 is excised after opening the chest cavity and the heart wall, by known surgical techniques. As a result, the membrane 42 is left with an opening therein, defined by inwardly facing side wall portions 46. Thereupon, sutures 40 are employed to sew fastening means in the form of a snap ring 38 into place, generally centrally of the side wall 46, that is, along the wall 46 and about half-way between the top and bottom surfaces of the membrane 42. In the case of an atrio-ventricular valve, the portion of the membrane 42 surrounding the opening is known as the annulus fibrosis, and the inner wall portions 46 thereof remaining after removal of the heart valve are fibrous or muscular tissues, or a combination of both, into which it is relatively simple to place the sutures so as to implant the ring. When the ring is sewn in placce, which normally can be done in 15 minutes or less, including the time taken to open the heart, the fastener or snap ring 38 is expanded by a conventional retractor or other known surgical instrument, and the valve assembly 8 is merely pushed downwardly into the opening 44 in a portion of the annulus fibrosis membrane 42 until the groove means 16 is in registry with the fastener or snap ring 38, whereupon the retractor is withdrawn and the ring 38 snaps into place in registry with the groove 16. Thereupon, the heart wall and chest cavity are closed in a conventional manner.

Referring now to FIG. 2, there is shown a principal advantage of the invention, namely that the walls 46 of the membrane 42 surround and abut the outer walls 12 of the valve 8, and the ring 38, in position of use, is totally surrounded, partially by the membrane 42, and the remainder by the surfaces of the body 10 which define the groove 16 in the side wall 12. The sutures are likewise totally surrounded by the membrane 42 and the body 10 of the valve. Thus, in contrast to other previously known constructions, there is little or no exposure of thrombogenic or potentially thrombogenic materials to the blood stream, particularly when healing has taken place. A principal drawback with prior art heart valves has been that sutures, sewing cuffs or the like have been exposed to the blood stream and have presented a source of clotting, which is extremely undesirable for obvious reasons.

It will be noted that the exterior of the valve body 10, is covered with a velour or satin-like finish. The fine fibers or hair-like projections comprising the velour facilitate adhesion between body tissues and the heart valve 8, and aid in the healing process as well as in the adhesion between the membrane 42 and the walls 12. The entire valve 8 is shown to include the velour outer covering, but in some cases, only the outer side walls include this covering.

Referring again to the details of construction of the valve unit 8, a preferred embodiment of the valve assembly 8 is shown in which the body 10, flaps 22, 24 and hinges 32, 34 are integrally formed from a plastic material such as polypropylene, which has excellent fatigue resistance and which is highly suitable for the long life required of the hinge portions 32, 34 and the flaps 18, 20, which are called upon to deflect open and return to a closed position millions of times or more. The velour or satin outer finish is preferably obtained by covering the polyproylene body 10 with a polyethylene terephthalate ("Dacron" or "Mylar") material which is well known and commercially available.

The fastening means shown, such as the ring 38, may be made of a non-thrombogenic material, preferably stainless steel or surgical grade silicone rubber. The construction of the ring shown in FIG. 4 is merely illustrative, since such a snap ring may contain overlapping end portions, such as a conventional key ring or the like, or may compose a spiral assembly of two turns or more closely adjacent one another, or the like. Another embodiment which is also preferred is to make the ring 38 a one-piece, continuous ring of silicone rubber, the words "snap ring" as used herein, and in the claims, being intended to include such constructions. If the material is a softer rubber material, it may have the sutures sewn therethrough. In any case, other methods of holding the fastener in place, such as stapling, may be used.

The shape of the illustrated valve is the preferred construction, namely one wherein the general shape of the valve body is that of a short cylinder with a groove extending circumferentially therearound. However, such exterior shape is not necessary, nor is it necessary that the groove be continuous, nor that the fastening means engage the body around its entire extent. Likewise, the groove means might conceivably be in the form of one or more outward projections adapted to register with a channel-type fastener disposed in the membrane. Obviously, these and other equivalent constructions will occur to those skilled in the art, and are considered to be within the scope of the present invention.

The valve assembly which is described is shown herein as being of the flap type, but it will be appreciated that in many cases, a caged ball, umbrella-type, duck-bill, cuspate, or other known type valve construction might be used with the fastening concept and method of the invention.

It will thus be seen that the present invention provides a novel check valve assembly and method, having numerous advantages and characteristics including those pointed out herein, and others which are inherent in the invention. Having completed a disclosure of the preferred embodiment of the invention so that those skilled in the art may practice the same, it is contemplated that modifications or variations thereof may be made by those skilled in the art which will fall within the scope of the appended claims.

We claim:

1. A prosthetic heart valve comprising, in combination, a body portion defined in part by a generally annular axially extending exterior sidewall portion, fluid control means formed integrally with said body and normally lying substantially entirely within the axial extent of said body, said fluid control means being adapted to permit blood flow therethrough in one direction upon application of fluid flow force in such direction and at least to diminish flow therethrough in the opposite direction upon application thereto of fluid flow force in said opposite direction, a generally annular groove formed in said body sidewall portion, said groove being of substantially reduced dimension in relation to the axial extent of said body sidewall portion and the thickness of the wall of the heart defining an opening into which said valve is adapted to be implanted, said body sidewall portion having an axial extent not substantially greater than the thickness of said heart wall, and a stiff retaining ring of a resilient non-toxic material at least partially encircling a major peripheral portion of said body and detachably received substantially wholly within said groove, said retaining ring being of approximately the same cross-sectional dimension as said groove, and being adapted to be sewn in place within said heart wall by sutures lying substantially entirely within the heart wall defining said opening, whereby said valve sidewall is adapted to be positioned with said groove snap-fitted about said ring to substantially cover said ring and said sutures in position of use within the heart.

2. A method of inserting a prosthetic check valve into a living body, said method comprising forming an opening of a desired size in a body membrane, said opening being defined by inwardly facing peripheral side wall means, sewing stiff but resilient fastener means in place in said opening in closely overlying relation to said side wall means, deforming said stiff but resilient fastener means outwardly while said fastener means remains in place in said membrane, inserting at least partially therein a check valve body comprising outer side wall means containing peripheral, fastener-receiving groove means therein, and allowing said fastener means to engage said valve body with said fastener means in registry with said groove means.

3. A method as defined in claim 2 which further includes the steps of sizing said fastener means and said groove means so that the thickness thereof are substantially less than the thickness of said membrane, and locating said fastener means in said membrane such that substantial portions of said side wall means defining said opening in said membrane extend to either side of said fastener means, and disposing said groove means in said outer side wall means of said body so as to leave substantial portions of said outer side wall means on either side of said groove means, whereby said inwardly facing peripheral side wall means of said membrane and said outer side wall means of said check valve body have substantial portions thereof abutting each other.

4. A method as defined in claim 2 which further includes allowing said membrane, in combination with said side wall means and said groove means, to surround totally said fastener means, when said valve body is in position of use, whereby thrombogenic materials caused by said fastening means or from means holding said fastening means in place in said membrane are immobilized by said membrane and said valve body.

References Cited

UNITED STATES PATENTS

| | | | |
|---|---|---|---|
| 2,682,057 | 6/1954 | Lord | 3—1 |
| 3,396,409 | 8/1968 | Melrose | 3—1 |
| 3,464,065 | 9/1969 | Cromie | 3—1 |

FOREIGN PATENTS

| | | | |
|---|---|---|---|
| 1,464,971 | 11/1966 | France | 3—1HV |
| 1,180,087 | 10/1964 | Germany | 3—1HV |
| 6617152 | 6/1960 | Netherlands | 3—1HV |

OTHER REFERENCES

"The Development of A Prosthetic Heart Valve Utilizing A Rigid Housing And A Flexible Butterfly-Wing Leaflet," by V. L. Gott et al., Trans. Amer. Soc. Artif. Int. Organs, vol. VIII, Apr. 13, 1962, pp. 72–78.

"An Inverted Tricuspid Plastic Mitral Valve," by R. W. Ernest et al., J. of Thoracic and Cardiovascular Surgery, vol. 46, No. 6, December 1963, pp. 737–743.

"Development of A Titanium Double-Caged Full-Orifice Ball Valve," by R. S. Cartwright et al., Trans. Amer. Soc. Artif. Int. Organs, vol. X, April 1964, pp. 231–236.

"Simplified Insertion of Aortic Homograft Valves With Nonthrombogenic Frames," by N. S. Braunwald et al., Trans. Amer. Soc. Artif. Int. Organs, vol. XIII, Apr. 15, 1967, pp. 111–115.

RICHARD A. GAUDET, Primary Examiner

R. L. FRINKS, Assistant Examiner

U.S. Cl. X.R.

128—334; 137—525.1